US006393220B1

(12) United States Patent
Nose et al.

(10) Patent No.: US 6,393,220 B1
(45) Date of Patent: May 21, 2002

(54) CAMERA WITH ELECTRONIC FLASH

(75) Inventors: Syuji Nose; Michitaka Nakazawa, both of Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/599,600

(22) Filed: Jun. 23, 2000

(30) Foreign Application Priority Data

Jun. 25, 1999 (JP) .......................................... 11-179787

(51) Int. Cl.[7] ............................ G03B 7/26; H05B 41/14

(52) U.S. Cl. .................. 396/205; 396/303; 315/241 R; 315/241 P

(58) Field of Search ................................ 396/159, 160, 396/163, 205, 206, 221, 303, 155; 315/241 P, 241 R

(56) References Cited

U.S. PATENT DOCUMENTS

| | | | | | |
|---|---|---|---|---|---|
| 4,075,536 | A | * | 2/1978 | Stevens | 315/241 P |
| 4,156,565 | A | * | 5/1979 | Harrison | 396/90 |
| 5,109,244 | A | * | 4/1992 | Otani et al. | 396/203 |
| 6,104,144 | A | * | 8/2000 | Yoneya et al. | 315/241 R |

FOREIGN PATENT DOCUMENTS

| | | |
|---|---|---|
| JP | A1296229 | 11/1989 |
| JP | A6205277 | 7/1994 |
| JP | A1080069 | 3/1998 |

* cited by examiner

*Primary Examiner*—Russell Adams
*Assistant Examiner*—Arthur A Smith
(74) *Attorney, Agent, or Firm*—Birch, Stewart, Kolasch & Birch, LLP

(57) ABSTRACT

A power source part supplies power to an electronic flash charging circuit and camera circuits such as an LCD backlight circuit. When the charge begins, the electricity stops being supplied to the camera circuits, and a high current (first charging current) is sent to the electronic flash charging circuit so that the electronic flash is rapidly charged. When the charging voltage of the electronic flash reaches a light-emission-possible voltage that is lower than a full-charge voltage, the charging current is lowered and the charge is continued, and the camera circuits such as the LCD backlight circuit and an imaging circuit start to be activated at the same time. Thus, a decline of the performance of the electronic flash such as a decline of the guide number and a reduction of the light-emission-possible time can be prevented, and the preparation time from the start of the charge to the time at which the camera gets ready for the shooting can be shortened.

21 Claims, 3 Drawing Sheets

CAMERA WITH ELECTRONIC FLASH

BACKGROUND OF THE INVENTION

1. Field of the Invention

The present invention generally relates to a camera with an electronic flash, and more particularly to charge control technics of an electronic flash which is built in or connected to a silver halide camera, a digital camera or the like.

2. Description of Related Art

In recent years, in a silver halide camera or an electronic still camera with a built-in electronic flash, the electronic flash and camera controlling circuits (a CCD driving circuit, an LCD driving circuit and so on) share the same power source. A load is large at the beginning of the charge of the electronic flash, and thus not enough electricity for normally operating the camera controlling circuits can be supplied to the camera controlling circuits. Therefore, the camera controlling circuits is not operated during the charge, and the charge is suspended when the camera controlling circuits is operated (Japanese Patent No. 2521128).

In the case of the above-described camera, however, the camera controlling circuits start to be operated after a main capacitor of the electronic flash is fully charged, and thus a shooting is not possible until the electronic flash is fully charged and a liquid crystal display (LCD) gets ready for displaying an image and a CCD gets ready for imaging the image. As a result, a good opportunity for shooting can be missed.

Japanese Patent Provisional Publication No. 10-80069 discloses a camera which detects that the voltage of a main capacitor reaches a light-emission-possible voltage and gets ready for a shooting before the main capacitor is fully charged. In case of an electronic still camera that gets ready for a shooting after an LCD displays an image, the image is not displayed on the LCD until an electronic flash is fully charged since a relatively large current is sent for driving the LCD. Therefore, likewise the above-described camera, the electronic still camera takes a long time to get ready for a shooting, and a good opportunity for shooting can be missed as a result.

On the other hand, an imaging device with an electronic flash disclosed in Japanese Patent Provisional Publication No. 6-205277 stops the charge when the charging voltage reaches a light-emission-possible voltage to display an image on an LCD. Thus, the shooting is ready in a short time, but a guide number declines and a light-emission-possible time is short.

SUMMARY OF THE INVENTION

The present invention has been developed in view of the above-described circumstances, and has as its object the provision of a camera with an electronic flash which can perform a shooting as soon as a charging voltage reaches a light-emission-possible voltage.

To achieve the above-described object, the present invention is directed to a camera with an electronic flash comprising: the electronic flash that has a charging circuit that charges a main capacitor and a light-emitting part that emits a light by discharging electricity accumulated in the main capacitor; a power source part that supplies electricity to the charging circuit and camera circuits other than the electronic flash; a charging voltage determining device that determines a charging voltage of the main capacitor; and a controlling part that stops functions of the camera circuits and charges the electronic flash by a first charging current from the start of the charge until the charging voltage reaches a light-emission-possible voltage that is lower than a full-charge voltage, and switches the first charging current to a second charging current that is lower than the first charging current to continue the charge and allows operations of the camera circuits to get ready for a shooting when the charging voltage reaches the light-emission-possible voltage.

According to the present invention, the electronic flash and the camera circuits share the power source part, and the controlling part controls the charge of the main capacitor and the operation of the camera circuits so that the camera gets ready for the shooting in a short time. When the charge is started, the controlling part stops the functions of the camera circuits and rapidly charges the electronic flash by a high electric current (the first charging current). When the charging voltage reaches a shooting-possible voltage (the light-emission-possible voltage) that is lower than the full-charge voltage, the controlling part switches the first charging current to the second charging current that is lower than the first charging current to continue the charge and the camera gets ready for the shooting.

Therefore, the shooting gets ready as soon as the charging voltage reaches the light-emission-possible voltage. A preparation time from the start of the charge to the time at which the camera gets ready for the shooting is short compared with that in a conventional camera that starts to activate the camera circuits after the full charge. Moreover, a decline of the performance of the electronic flash such as a decline of a guide number and a reduction of a light-emission-possible time can be prevented since the charge is continued by the second charging current after the charging voltage reaches the light-emission-possible voltage.

To achieve the above-described object, the present invention is directed to a camera with an electronic flash comprising: the electronic flash that has a charging circuit that charges a main capacitor and a light-emitting part that emits a light by discharging electricity accumulated in the main capacitor; a power source part that supplies electricity to the charging circuit and camera circuits other than the electronic flash; a charging voltage determining device that determines a charging voltage of the main capacitor; and a controlling part that stops functions of the camera circuits and charges the electronic flash by a first charging current from the start of the charge until the charging voltage reaches a preset voltage that is a predetermined voltage lower than a light-emission-possible voltage that is lower than a full-charge voltage, and switches the first charging current to a second charging current that is lower than the first charging current to continue the charge and activates the camera circuits when the charging voltage reaches the preset voltage.

According to the present invention, when the charge is started, the controlling part stops the functions of the camera circuits and rapidly charges the electronic flash by a high electric current (the first charging current). When the charging voltage reaches the preset voltage that is the predetermined voltage lower than a shooting-possible voltage (the light-emission-possible voltage), the controlling part switches the first charging current to the second charging current that is lower than the first charging current to continue the charge and starts to activate the camera circuits at the same time. The camera circuits are activated so that the camera gets ready for the shooting as soon as the charging circuit reaches the light-emission-possible voltage.

A preparation time from the start of the charge to the time at which the camera gets ready for the shooting is short compared with that in the conventional camera. Moreover, a decline of the performance of the electronic flash can be prevented since the charge is continued by the second charging current after the charging voltage reaches the light-emission-possible voltage.

The camera may further comprise a maximum electricity determining device that determines electricity that can be supplied from the power source part and an automatic setting device that changes at least one of the following, the preset voltage, the first charging current and the second charging current, according to the determination result of the maximum electricity determining device.

The present invention may be applied to a camera, such as an electronic still camera with a liquid crystal monitor, whose camera circuits include an imaging device, a signal processing circuit that processes signals outputted from the imaging device to generate image data and an image displaying device that displays an image according to the image data.

BRIEF DESCRIPTION OF THE DRAWING

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Hereunder the preferred embodiment of the present invention is explained in detail according to the accompanying drawings.

Figure 1:
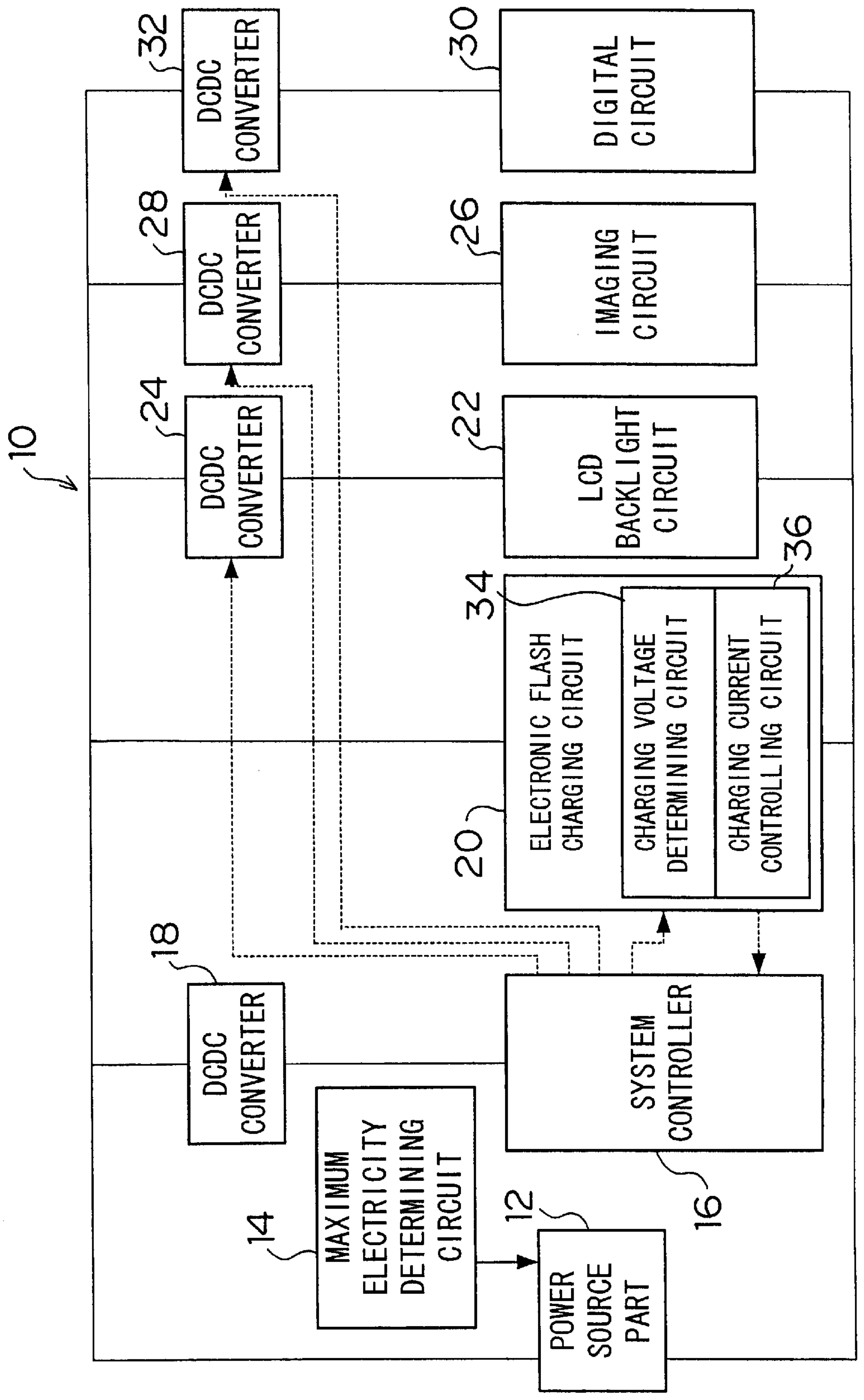
FIG. 1 is a block diagram showing the structure of a camera with an electronic flash according to the embodiment of the present invention.

FIG. 1 is a block diagram showing the structure of a control system of a camera 10 with an electronic flash according to the embodiment of the present invention. The camera 10 comprises a power source part 12, a maximum electricity determining circuit 14 for determining electricity that can be supplied from the power source part 12, a system controller 16, a DCDC converter 18 that supplies electricity for driving the system controller 16, an electronic flash charging circuit 20, an LCD backlight circuit 22 for driving a liquid crystal display (LCD), a DCDC converter 24 that supplies electricity for driving the LCD backlight circuit 22, an imaging circuit 26 including a CCD solid imaging device (CCD), a driving circuit for the CCD, an analog processing circuit for processing CCD output signals, and so on, a DCDC converter 28 that supplies electricity for driving the imaging circuit 26, a digital circuit 30 that digital processes image data that has passed the analog processing circuit of the imaging circuit 26 and a DCDC converter 32 that supplies electricity for driving the digital circuit 30.

The power source part 12 supplies electricity to the DCDC converters 18, 24, 28 and 32 and the electronic flash charging circuit 20, and it is, for example, a battery. The maximum electricity determining circuit 14 has, for example, a resistor with a low resistance, and determines the maximum electricity that can be supplied from the power source part 12 by measuring the electric current flowing through the resistor.

The system controller 16 is mainly composed of a central processing unit (CPU), and is equipped with circuits for supporting other functions. The system controller 16 controls the circuits according to a predetermined control program and controls the DCDC converters 18, 24, 28 and 32. The electronic flash charging circuit 20 includes a charging voltage determining circuit 34 and a charging current controlling circuit 36.

The structure of the electronic flash is not shown. As is generally known, the electronic flash comprises a main capacitor and a xenon tube (light emitting part), and makes the xenon tube emit a light by discharging electricity accumulated in the main capacitor in response to an pushing operation of a shutter release button.

The operation of the above-described camera with the electronic flash will now be explained.

First, a general charge controlling method will be explained. After the power of the system is turned on by an operation of a power switch (not shown), the electronic flash charging circuit 20 is activated and it starts charging the main capacitor according to an instruction of the system controller 16 so that the camera 10 gets ready for a shooting. The charging voltage determining circuit 34 monitors the voltage of the main capacitor, and the voltage is used for the control of a charging current and the control of the LCD and other circuits.

The voltage of the main capacitor increases after the charge starts. When the voltage reaches a predetermined shooting-possible voltage (light-emission-possible voltage), a signal Cok (electronic flash charge completion signal) indicating that the shooting-possible voltage has been reached is transmitted from the electronic flash charging circuit 20 to the system controller 16.

After that, the charge is continued for a fixed time with a timer, so that the main capacitor enters a state in which the voltage keeps at a fixed voltage and it does not increase any more (full-charged state). After the main capacitor enters the full-charged state, the system controller 16 performs control as follows. Firstly, the system controller 16 instructs a predetermined information indicating device to inform the user that the camera is ready for a shooting. For example, the information indicating device turns on a lamp or indicates a message. Secondly, the system controller 16 stops the charging operation of the electronic flash charging circuit 20. After the charging operation is stopped, the voltage of the main capacitor gradually decreases by a resistor connected on a high-voltage line. Thirdly, the system controller 16 activates the DCDC converter 24 for the LCD backlight circuit 22 to supply electricity to the LCD backlight circuit 22. Fourthly, the system controller 16 activates the DCDC converter 28 for the imaging circuit 26 to supply electricity to the imaging circuit 26. When the LCD and the imaging circuit 26 and so on are activated, the camera 10 enters a shooting waiting state.

In the shooting waiting state, imaging signals are obtained by the CCD of the imaging circuit 26, and a predetermined analog signal processing is performed for the imaging signals. Then the imaging signals are transmitted to the digital circuit 30, which performs a known digital image processing such as generation of a luminance signal and a color difference signal and γ correction. The digital-processed image data is transmitted to the LCD, on which an image is displayed. The LCD displays the animation that is on an imaging part.

When the shutter release button is pushed in the shooting waiting state, the camera 10 enters a shooting mode, and the image data is captured in response to the pushing operation of the shutter release button and the recording (writing) operation of the obtained image data is started.

The camera control processing will now be explained from the point of view of electric currents.

Figure 2:
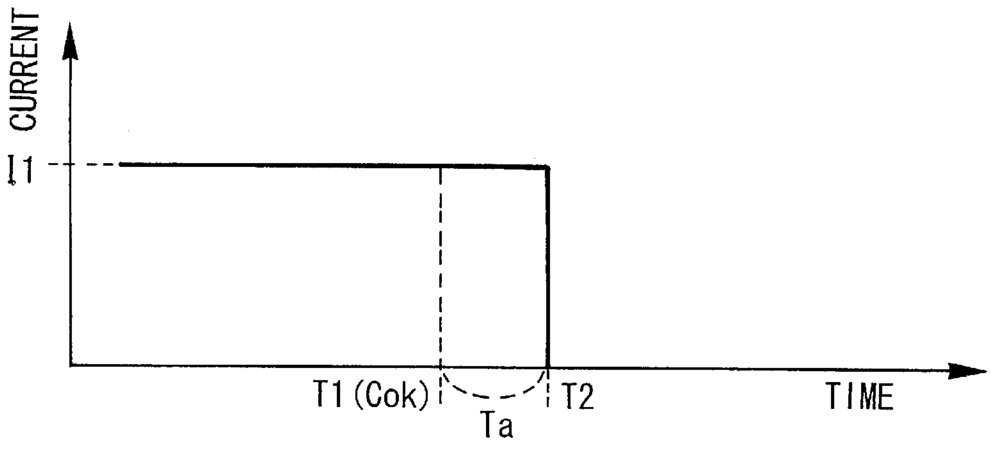
FIG. 2 is a graph diagram showing a current of the electronic flash when the electronic flash is charged in a general charge control method.

FIG. 2 shows the electric current when the electronic flash is charged. The main capacitor is charged by a fixed current I1 from the start of the charge. When the voltage of the main capacitor reaches the shooting-possible voltage, the signal (electronic flash charge completion signal) Cok indicating that is transmitted from the electronic flash charging circuit 20 to the system controller 16. The charge is continued for a time Ta after the time T1 at which the electronic flash charge completion signal Cok is outputted, so that the voltage of the main capacitor rises to a full-charge voltage. This prevents the voltage of the main capacitor from falling below the shooting-possible voltage after the charge of the electronic flash is stopped (T2).

Figure 3:
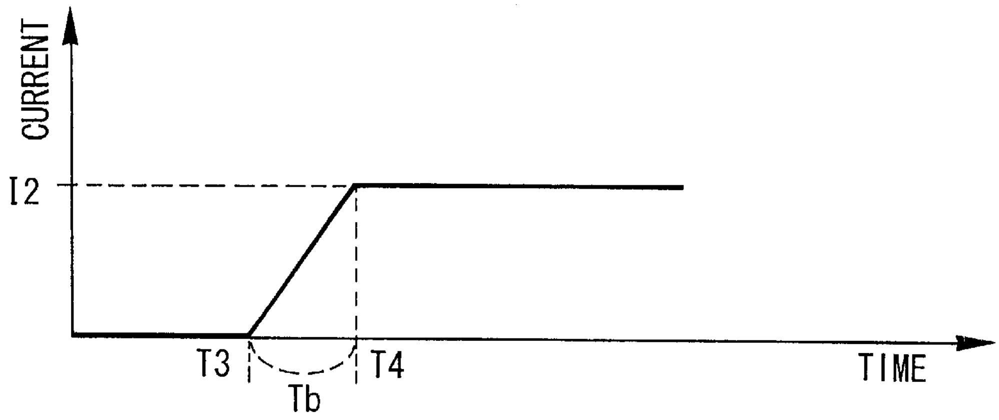
FIG. 3 is a graph diagram showing a current of a liquid crystal display (LCD) when the LCD is activated.

FIG. 3 shows an electric current of the LCD. The LCD starts to be activated at a time T3, and there is a time lag (Tb) between the time T3 and a time T4 at which the LCD starts displaying the image. The current when the LCD displays the image is I2.

Figure 4:
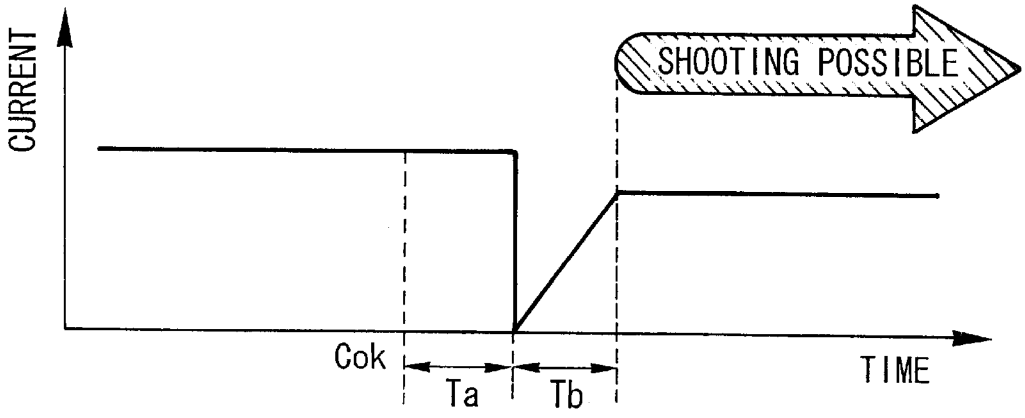
FIG. 4 is a graph diagram showing a current of the electronic flash and the LCD in the general charge control method.

FIG. 4 shows an electric current in case the LCD starts to be activated as shown in FIG. 3 when the charge of the electronic flash is stopped (T2) as shown in FIG. 2. In this case, the LCD starts displaying the image a time Ta+Tb after the electronic flash charge completion signal Cok is outputted.

Figure 5:
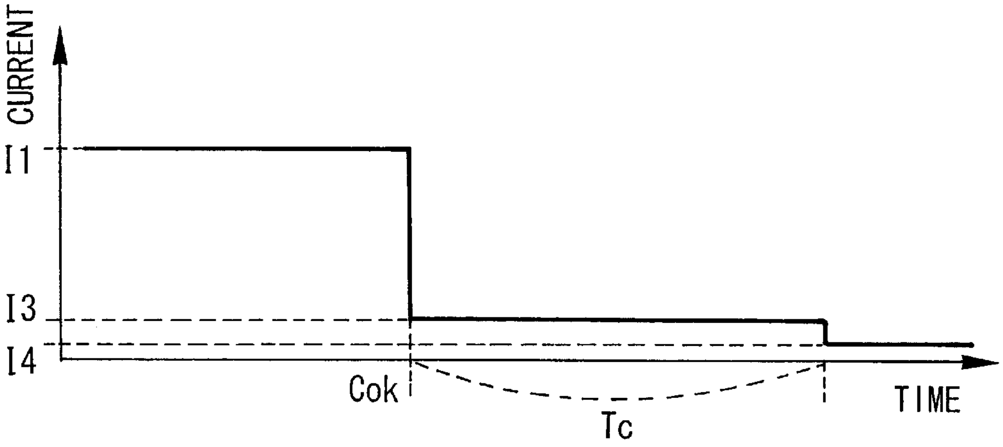
FIG. 5 is a graph diagram showing a current of the electronic flash when the electronic flash is charged in a charge control method of the camera with the electronic flash to which the present invention is applied.

On the other hand, the control of the camera 10 with the electronic flash according to the embodiment of the present invention is as follows. FIG. 5 shows the electric current when the electronic flash is charged in the present invention.

After the power of the system is turned on by the operation of the power switch (not shown), the electronic flash charging circuit 20 is activated and it starts charging the main capacitor according to the instruction of the system controller 16 so that the camera 10 gets ready for a shooting. The charging current (first charging current) is I1 at that time. The charging voltage determining circuit 34 monitors the voltage of the main capacitor during the charge.

When the charging voltage reaches the shooting-possible voltage, the electronic flash charge completion signal Cok is outputted from the electronic flash charging circuit 20. In response to the electronic flash charge completion signal Cok outputted from the electronic flash charging circuit 20, the system controller 16 sets an charging current setting terminal of the charging current controlling circuit 36 at I3 (equivalent to second charging current) and the charge is continued by the charging current I3 that is lower than the charging current I1. At the same time, the system controller 16 activates the DCDC converter 24 for the LCD backlight circuit 22 to supply electricity to the LCD backlight circuit 22, and activates the DCDC converter 28 for the imaging circuit 26 to supply electricity to the imaging circuit 26. Then the LCD is activated, and the camera 10 gets ready for the shooting (the shooting waiting state). At this time, the predetermined information indicating device informs the user that the camera 10 is ready for a shooting.

When the charge is continued for a fixed time (Tc) by the charging current I3, the voltage of the main capacitor reaches the full-charge voltage. After that, the charging current is set at I4 that is lower than the charging current I3 and the charge is continued. The charge is continued even after the full-charge to make up the loss of a discharge by the resistor connected on the high-voltage line. The electricity may be supplied at predetermined time intervals as pulses instead.

In the shooting waiting state, an animation is displayed on the LCD in the same way as that in FIG. 4. When the shutter release button is pushed in the shooting waiting state, the camera 10 stops the charge of the electronic flash to enter the shooting mode. Then, the image data is captured in response to the pushing operation of the shutter release button and the recording (writing) operation of the obtained image data is started. A recording device for the image data may be an external recording medium such as a memory card, and may be a built-in memory. After the recording processing, the charge by the first charging current is resumed.

The control processing of the camera with the electronic flash according to the embodiment of the present invention will now be explained from the point of view of electric currents.

As explained in FIG. 5, the charging current is set at I1 when the charge of the electronic flash is started. When the electronic flash charge completion signal Cok is outputted from the electronic flash charging circuit 20, the charging current is set at I3 that is lower than the charging current I1 and the charge is continued. In this case, the time Tc taken for the voltage of the main capacitor to reach the full-charge voltage is longer than the time Ta in FIG. 2 since the charging current I3 is lower than the charging current I1. The ratio of the time Ta to the time Tc depends on the charging current I3.

Figure 6:
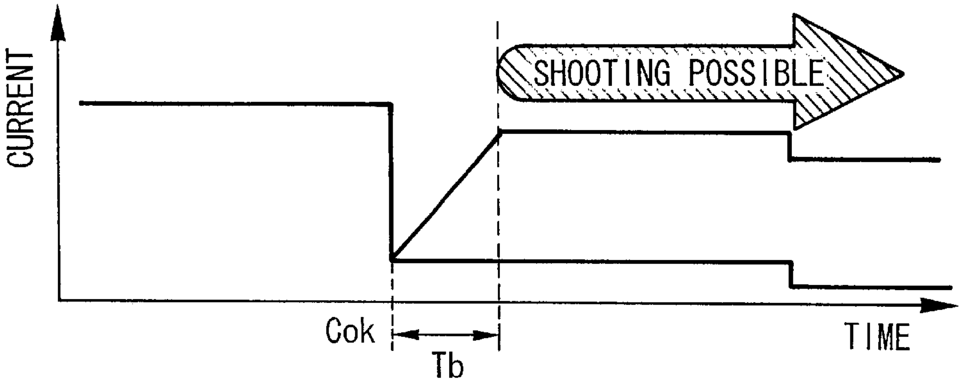
FIG. 6 is a graph diagram showing a current of the electronic flash and the LCD in the charge control method of the camera with the electronic flash to which the present invention is applied.

Meanwhile, the current of the LCD is the same as that explained in FIG. 3. In case of the control processing of the camera to which the present invention is applied, the LCD starts to be activated when the electronic flash charge completion signal Cok is outputted in FIG. 5. FIG. 6 shows the current in the control processing. As shown in FIG. 6, the LCD starts displaying the image the time Tb after the electronic flash charge completion signal Cok is outputted, and the time Tb is shorter than the time Ta+Tb explained in FIG. 4. Therefore, the camera 10 can be ready for a shooting more quickly.

Another embodiment of the present invention will now be explained.

Figure 7:
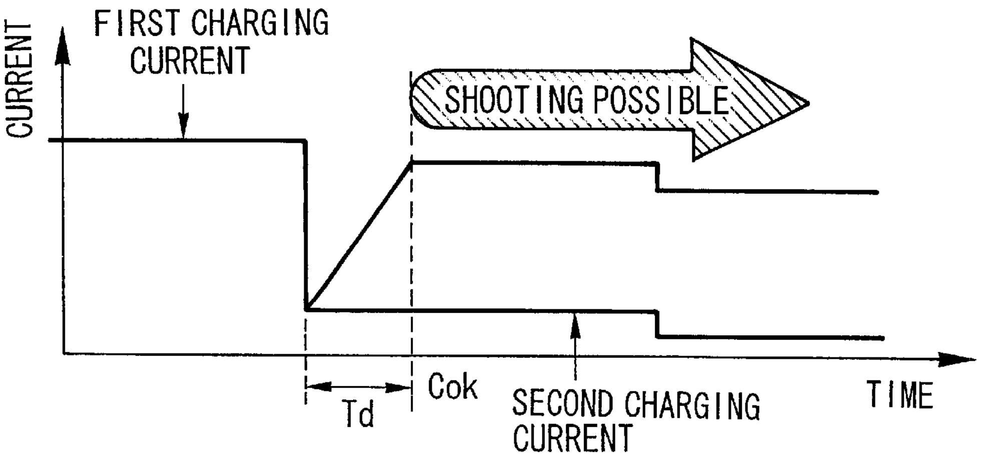
FIG. 7 is a graph diagram showing a current of the electronic flash and the LCD in a charge control method of another embodiment of the present invention.

A control processing in FIG. 7 may be adopted in the system of the camera 10 shown in FIG. 1. After the power of the system is turned on by the operation of the power switch (not shown), the electronic flash charging circuit 20 is activated and it starts charging the main capacitor according to the instruction of the system controller 16 so that the camera 10 gets ready for a shooting. The charging current is set at the first charging current.

The charging voltage determining circuit 34 monitors the voltage of the main capacitor during the charge. When the charging voltage reaches a preset voltage, the charging current is switched to the second charging current that is lower than the first charging current and the charge is continued. At the same time, the electricity starts to be supplied to the LCD backlight circuit 22 and the imaging circuit 26.

The preset voltage is a predetermined voltage lower than the shooting-possible voltage. For example, the shooting-possible voltage is 270V, and the preset voltage is 240V that is 30V lower than the shooting-possible voltage. The second charging current is set, according to the voltage of the power supply part 12, at an electric current that can be supplied to the electronic flash charging circuit 20 while the other circuits (the LCD backlight circuit 22, the imaging circuit 26 and so on) normally operates.

A fixed time (Td) after the charging current is switched to the second charging current, the voltage of the main capacitor reaches the shooting-possible voltage, and the LCD starts displaying the animation and the camera 10 enters the shooting-possible state (shooting-waiting state).

The charge is continued by the second charging current. When the voltage of the main capacitor reaches the full-charge voltage, the charging current is switched to a third charging current that is lower than the second charging current and the charge is continued to make up the loss of the discharge by the connected resistor. As explained in FIG. 5, the electricity may be supplied at predetermined time intervals as pulses instead.

When the shutter release button is pushed in the shooting waiting state, the camera 10 stops the charge of the electronic flash to enter the shooting mode. Then, the image data is captured in response to the pushing operation of the shutter release button and the recording (writing) operation of the obtained image data is started.

The electricity starts to be supplied to the LCD backlight circuit 22 and the imaging circuit 26 before the voltage of the main capacitor reaches the shooting-possible voltage, and thus the shooting can be performed as soon as the voltage of the main capacitor reaches the shooting-possible voltage. Therefore, a preparation time from the start of the charge to the time at which the camera 10 gets ready for the shooting can be shortened.

The preset voltage, the first charging current and the second charging current are set according to the voltage of the power source part 12. The maximum electricity determining circuit 14 determines the maximum electricity that can be supplied from the power source part 12, and a function that automatically adjusts at least one of the first and second charging currents according to an instruction of the system controller 16 on the basis of the determination result may be added. In this case, the preparation time from the start of the charge to the time at which the camera 10 gets ready for the shooting can be further shortened.

The operation when the power is turned on by the operation of the power switch is explained. But, a similar charge control processing is applied when the mode is switched to the shooting mode from a mode such as a regeneration mode.

The present invention is applied to the camera with the LCD, but the camera circuits may be activated in response to the pushing operation of the shutter release button in case of a camera without an image displaying device such as the LCD. In this case, when the charging voltage reaches the shooting-possible voltage, the charging current is lowered and the camera enters the shooting-waiting state to wait for an instruction for the start of the shooting.

As explained above, according to the camera with the electronic flash of the present invention, when the charging voltage of the electronic flash reaches the light-emission-possible voltage that is lower than the full-charge voltage, the charging current is lowered and the charge is continued, and the camera gets ready for the shooting by, for example, activating the camera circuits at that time. Thus, a decline of the performance of the electronic flash such as a decline of the guide number and a reduction of the light-emission-possible time can be prevented, and the preparation time from the start of the charge to the time at which the camera 10 gets ready for the shooting can be shortened so that the shooting can be quickly performed when the electronic flash is used.

As explained above, according to the camera with the electronic flash of the present invention, when the charging voltage of the electronic flash reaches the preset voltage that is the predetermined voltage lower than the light-emission-possible voltage, the charging current is lowered and the charge is continued, and the camera circuits start to be activated at the same time. Therefore, the camera can perform the shooting as soon as the charging voltage reaches the light-emission-possible voltage without lowering the performance of the electronic flash.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera with an electronic flash comprising:

the electronic flash that has a charging circuit that charges a main capacitor and a light-emitting part that emits a light by discharging electricity accumulated in the main capacitor;

a power source part that supplies electricity to the charging circuit and camera circuits other than the electronic flash;

a charging voltage determining device that determines a charging voltage of the main capacitor; and a controlling part that stops functions of the camera circuits and charges the electronic flash by a first charging current from the start of the charge until the charging voltage reaches a light-emission-possible voltage that is lower than a full-charge voltage, and switches the first charging current to a second charging current that is lower than the first charging current to continue the charge and allows operations of the camera circuits to get ready for a shooting when the charging voltage reaches the light-emission-possible voltage.

2. The camera with the electronic flash as set forth in claim 1, wherein the controlling part activates the camera circuits when switching the charging current from the first charging current to the second charging current.

3. The camera with the electronic flash as set forth in claim 1, further comprising:

a maximum electricity determining device that determines electricity that can be supplied from the power source part; and an automatic setting device that changes at least one of the following, the first charging current and the second charging current, according to the determination result of the maximum electricity determining device.

4. The camera with the electronic flash as set forth in claim 1, wherein the camera circuits include an imaging device, a signal processing circuit that processes signals outputted from the imaging device to generate image data and an image displaying device that displays an image according to the image data.

5. A camera with an electronic flash comprising:

the electronic flash that has a charging circuit that charges a main capacitor and a light-emitting part that emits a light by discharging electricity accumulated in the main capacitor;

a power source part that supplies electricity to the charging circuit and camera circuits other than the electronic flash;

a charging voltage determining device that determines a charging voltage of the main capacitor; and a controlling part that stops functions of the camera circuits and charges the electronic flash by a first charging current from the start of the charge until the charging voltage reaches a preset voltage that is a predetermined voltage lower than a light-emission-possible voltage that is lower than a full-charge voltage, and switches the first charging current to a second charging current that is lower than the first charging current to continue the charge and activates the camera circuits when the charging voltage reaches the preset voltage.

6. The camera with the electronic flash as set forth in claim 5, further comprising:

a maximum electricity determining device that determines electricity that can be supplied from the power source part; and an automatic setting device that changes at least one of the following, the preset voltage, the first charging current and the second charging current, according to the determination result of the maximum electricity determining device.

7. The camera with the electronic flash as set forth in claim 5, wherein the camera circuits include an imaging device, a signal processing circuit that processes signals outputted from the imaging device to generate image data and an image displaying device that displays an image according to the image data.

8. A method of controlling a camera with an electronic flash comprising:

supplying electricity to a charging circuit of the electronic flash that charges a main capacitor of the electronic flash, and to camera circuits other than the electronic flash;

determining a charging voltage of the main capacitor;

inhibiting functions of the camera circuits and charging the electronic flash by a first charging current until the charging voltage reaches a light-emission-possible voltage that is lower than a full-charge voltage;

switching the first charging current to a second charging current that is lower than the first charging current to continue the charge when the charging voltage reaches the light-emission-possible voltage; and allowing operations of the camera circuits to get ready for a shooting when the charging voltage reaches the light-emission-possible voltage.

9. A method of controlling a camera with an electronic flash comprising:

supplying electricity to a charging circuit of the electronic flash that charges a main capacitor of the electronic flash, and to camera circuits other than the electronic flash;

determining a charging voltage of the main capacitor;

inhibiting functions of the camera circuits and charging the electronic flash by a first charging current until the charging voltage reaches a preset voltage lower than a light-emission-possible voltage that is lower than a full-charge voltage;

switching the first charging current to a second charging current that is lower than the first charging current to continue the charge when the charging voltage reaches the preset voltage; and activating the camera circuits when the charging voltage reaches the preset voltage.

10. A camera comprising:

an electronic flash including a capacitor; and a power source for supplying a charging current to the electronic flash, wherein the amount of the charging current supplied is dependent upon a charging voltage of the capacitor, wherein the amount of the charging current supplied by the power source is decreased when the charging voltage reaches a predetermined level, wherein the predetermined level is a light-emission-possible voltage level, and wherein the light-emission-possible voltage level corresponds to the minimum voltage needed to allow the camera to shoot.

11. A camera comprising:

an electronic flash including a capacitor; and a power source for supplying a charging current to the electronic flash, wherein the amount of the charging current supplied is dependent upon a charging voltage of the capacitor, wherein the amount of the charging current supplied by the power source is decreased when the charging voltage reaches a predetermined level, wherein the predetermined level is lower than a light-emission-possible voltage level, and wherein the light-emission-possible voltage level corresponds to the minimum voltage needed to allow the camera to shoot.

12. The camera of claim 11 further comprising camera controlling circuits for preparing the camera for a shooting, wherein the camera control circuits are activated when the charging voltage level reaches the predetermined level.

13. The camera of claim 12, wherein the camera controlling circuits include an image device, a signal processing circuit that processes signals outputted from the imaging device to generate image data, and an image displaying device that displays an image according to the image data.

14. The camera of claim 11 further comprising camera controlling circuits for preparing the camera for a shooting, wherein the camera control circuits are activated when the charging voltage level reaches the predetermined level.

15. The camera of claim 14, wherein the camera controlling circuits include an image device, a signal processing circuit that processes signals outputted from the imaging device to generate image data, and an image displaying device that displays an image according to the image data.

16. A method for controlling the charge of an electronic flash of a camera comprising:

determining an amount of charging current to be supplied to the electronic flash based upon a charging voltage level of the capacitor; and supplying the determined amount of charging current to the electronic flash, wherein the determined amount of current is decreased when the charging voltage level reaches a predetermined level, and the predetermined level is a light-emission-possible voltage level, and wherein the light-emission-possible voltage level corresponds to the minimum voltage needed to allow the camera to shoot.

17. The method of claim 16 further comprising, activating camera control circuits for preparing the camera for a shooting when the charging voltage level reaches the predetermined level.

18. The method of claim 17, wherein the camera controlling circuits include an image device, a signal processing circuit that processes signals outputted from the imaging device to generate image data, and an image displaying device that displays an image according to the image data.

19. A method for controlling the charge of an electronic flash of a camera comprising:

determining an amount of charging current to be supplied to the electronic flash based upon a charging voltage level of the capacitor; and supplying the determined amount of charging current to the electronic flash, wherein the determined amount of current is decreased when the charging voltage level reaches a predetermined level, and the predetermined level is lower than a light-emission-possible voltage level, and wherein the light-emission-possible voltage level corresponds to the minimum voltage needed to allow the camera to shoot.

20. The method of claim 19 further comprising, activating camera control circuits for preparing the camera for a shooting when the charging voltage level reaches the predetermined level.

21. The method of claim 20, wherein the camera controlling circuits include an image device, a signal processing circuit that processes signals outputted from the imaging device to generate image data, and an image displaying device that displays an image according to the image data.

* * * * *